(12) United States Patent
Hayakawa

(10) Patent No.: US 8,121,592 B2
(45) Date of Patent: Feb. 21, 2012

(54) MOBILE COMMUNICATION SYSTEM AND COMMUNICATION HOLDING METHOD

(75) Inventor: Yoshiaki Hayakawa, Tokyo (JP)

(73) Assignee: NEC Infrontia Corporation, Kanagawa (JP)

( * ) Notice: Subject to any disclaimer, the term of this patent is extended or adjusted under 35 U.S.C. 154(b) by 938 days.

(21) Appl. No.: 11/842,780

(22) Filed: Aug. 21, 2007

(65) Prior Publication Data

US 2008/0057950 A1  Mar. 6, 2008

(30) Foreign Application Priority Data

Aug. 30, 2006  (JP) .................................. 2006-232916

(51) Int. Cl.
*H04W 4/00* (2009.01)
*H04L 12/66* (2006.01)

(52) U.S. Cl. ....................... 455/426.2; 370/331; 370/352

(58) Field of Classification Search ................ 455/426.2
See application file for complete search history.

(56) References Cited

U.S. PATENT DOCUMENTS

| 2004/0198344 | A1* | 10/2004 | Pitt et al. ..................... | 455/426.1 |
| 2004/0264410 | A1* | 12/2004 | Sagi et al. ..................... | 370/331 |
| 2005/0063359 | A1* | 3/2005 | Jagadeesan et al. .......... | 370/352 |

FOREIGN PATENT DOCUMENTS

| JP | 9-289680 A | 11/1997 |
| JP | 10-108245 A | 4/1998 |
| JP | 2000-358280 A | 12/2000 |
| JP | 2001-112044 A | 4/2001 |
| JP | 2002-319961 A | 10/2002 |

\* cited by examiner

*Primary Examiner* — Lester Kincaid
*Assistant Examiner* — Andy Gu
(74) *Attorney, Agent, or Firm* — Sughrue Mion, PLLC

(57) ABSTRACT

A mobile terminal, to which a phone number of a private IP network and a phone number of a public network are allocated, detects whether the mobile terminal moves from a communication area of a IP wireless base station of a private IP network while the mobile terminal communicates with an IP terminal connected to an IP-PBX of the private IP network through an IP wireless base station of the private IP network. The mobile terminal notifies the IP-PBX that it moves from the communication area of the IP wireless base station to the communication area of the public wireless base station when the mobile terminal detects said movement. The IP-PBX sends instruction for a gateway device, which connects communication between the private IP network and the public network, to call the phone number of the public network of the mobile terminal. The mobile terminal responds to the call from the gateway device through the public wireless base station while the mobile terminal communicates with the IP terminal through the IP wireless base station. The mobile terminal and the gateway device are connected so as to communicate mutually. The IP-PBX switches a communication path between the mobile terminal and the IP terminal from a communication path through the IP wireless base station to a communication path through the public wireless base station.

4 Claims, 4 Drawing Sheets

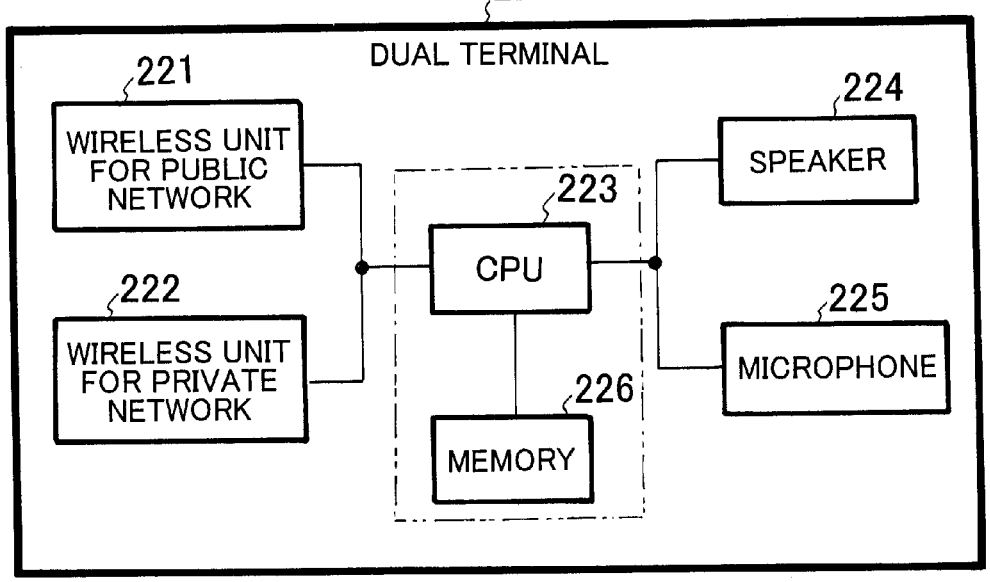

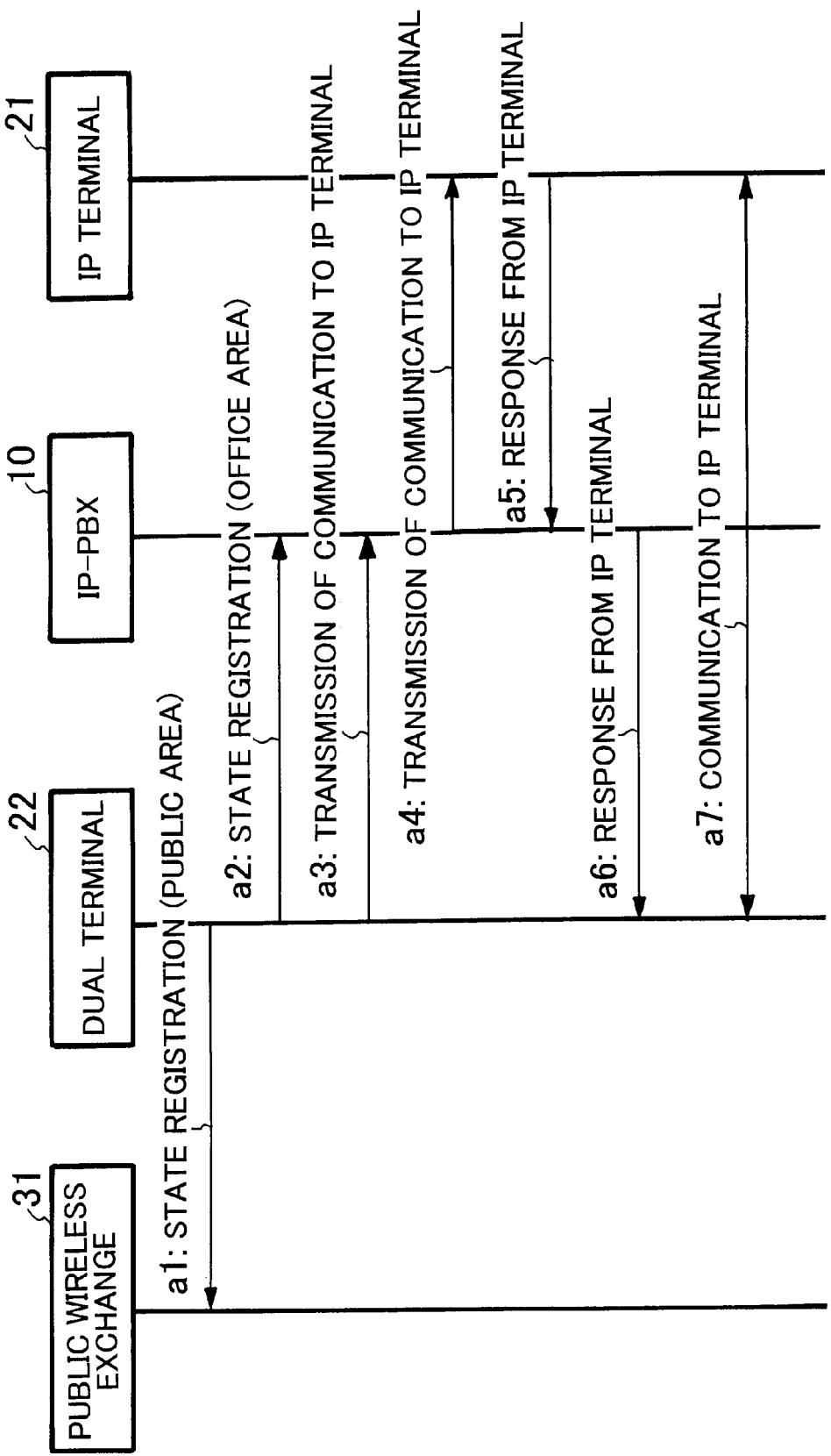

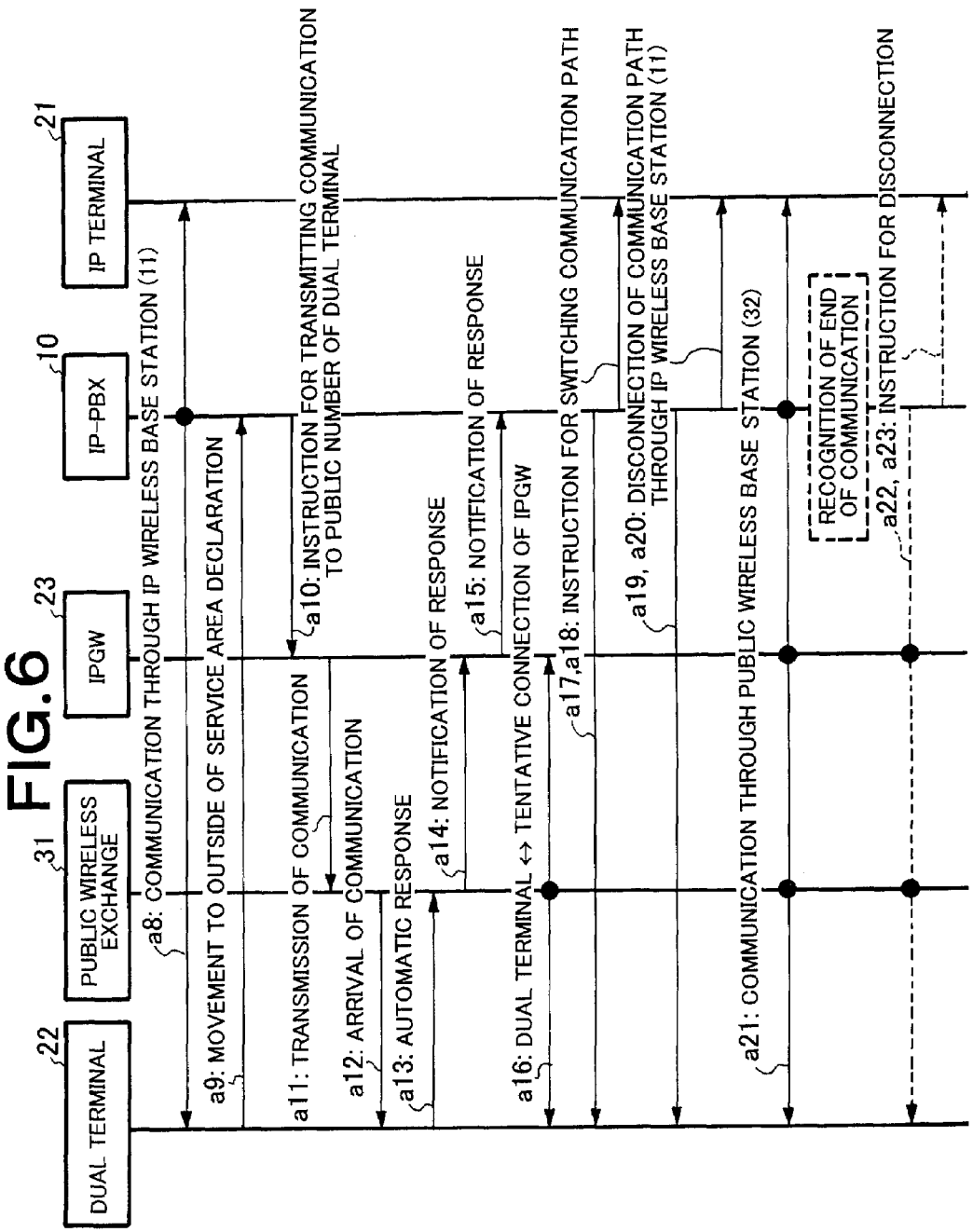

MOBILE COMMUNICATION SYSTEM AND COMMUNICATION HOLDING METHOD

This application is based upon and claims the benefit of priority from Japanese patent application No. 2006-232916, filed on Aug. 30, 2006, the disclosure of which is incorporated herein in its entirety by reference.

BACKGROUND OF THE INVENTION

1. Field of the Invention

The present invention relates to a mobile communication technology, and, more particularly, to a communication of a mobile terminal in an area in which a private wireless network and a public wireless network mixedly exists.

2. Description of the Related Art

There is a dual mode terminal as a type of mobile terminals which can cope with a public PHS network that provides a public PHS (Personal Handyphone System) service and with a private PHS network that provides a private PHS service, respectively.

The dual mode terminal stores the subscriber numbers of the public PHS network and the subscriber numbers of the private PHS network and switches a subscriber number to be recognized according to a PHS network to be used.

However, when the dual mode terminal is located outside of a public PHS network's service area, even if a subscriber number of the public PHS network is dialed, the terminal of a communication partner cannot be called. On the other hand, when the dual mode terminal is located inside of a private PHS network's service area, the communication partner can be called by dialing an extension number or a dial-in number even if the dual mode terminal is located outside of the public PHS network's service area. As described above, a user of the terminal has to select a dial number according to the communication area of a present location each time the user transmits an outgoing communication.

Japanese Patent Application Laid-Open (JP-A) No. 2000-358280 proposes a method of overcoming the inconvenience of the user. According to the method of JP-A No. 2000-358280, when a terminal moves to a location outside a public service area and it is recognized that the terminal is located inside a private service area, the terminal automatically carries out an operation for transmitting an outgoing communication in a private mode and accesses to an exchange corresponding to PHS and registers it to transfer a response to the outgoing communication.

Further, recently, a system making use of an IP network as a private network has become widespread. An IP-PBX (Internet Protocol-Private Branch eXchange), which acts as an exchange for controlling a communication carried out by an IP terminal, is installed to the IP network. A technology making use of the IP-PBX is disclosed in, for example, JP-A No. 2002-319961.

However, when it is intended to construct a private network in an office, a lot of wireless base stations of the private network must be installed in the office to permit a terminal to move while holding a communication. In this case, a vast cost is necessary to introduce the private network. Accordingly, when a firm and the like intend to construct a private network for operation, a problem arises in that a vast investment is required.

SUMMARY OF THE INVENTION

An object of the present invention is to provide a technology for reducing a cost necessary to introduce a private network for making use of a mobile terminal.

A mobile communication system according to the present invention comprises: an IP-PBX connected to a private IP network; an IP wireless base station connected to the private IP network; an IP terminal connected to the IP-PBX; a public wireless exchange connected to a public network; a public wireless base station connected to the public network; a gateway device connecting between the private IP network and the public network; and a mobile terminal to which a phone number of the private IP network and a phone number of the public network are allocated, wherein the mobile terminal comprises a wireless unit communicating with the public wireless base station, a wireless unit communicating with the IP wireless base station and a control unit detecting whether the mobile terminal moves from a communication area of the IP wireless base station to a communication area of the public wireless base station while the mobile terminal communicates with the IP terminal through the IP wireless base station, wherein the control unit notifies the IP-PBX that the mobile terminal moves from the communication area of the IP wireless base station to the communication area of the public wireless base station when the control unit detects said movement, and responds to a call from the gateway device through the public wireless base station while the mobile terminal communicates with the IP terminal through the IP wireless base station, wherein the gateway device notifies the IP-PBX of the response from the mobile terminal, wherein the IP-PBX instructs the gateway device to call the phone number of the public network of the mobile terminal when the IP-PBX is notified by the mobile terminal of said movement, and switches a communication path between the mobile terminal and the IP terminal from a communication path through the IP wireless base station to a communication path through the public wireless base station when the IP-PBX receives the response from the mobile terminal through the gateway device.

A communication holding method of the present invention comprises: detecting whether a mobile terminal, to which a phone number of a private IP network and a phone number of a public network are allocated, moves from a communication area of a IP wireless base station of a private IP network while the mobile terminal communicates with an IP terminal connected to an IP-PBX of the private IP network through an IP wireless base station of the private IP network; notifying the IP-PBX that the mobile terminal moves from the communication area of the IP wireless base station to the communication area of the public wireless base station when the mobile terminal detects said movement; sending instruction for a gateway device, which connects communication between the private IP network and the public network, from the IP-PBX to call the phone number of the public network of the mobile terminal; responding by the mobile terminal to the call from the gateway device through the public wireless base station while the mobile terminal communicates with the IP terminal through the IP wireless base station; connecting between the mobile terminal and the gateway device so as to communicate mutually; and switching a communication path between the mobile terminal and the IP terminal from a communication path through the IP wireless base station to a communication path through the public wireless base station.

According to the present invention, even if the mobile terminal, which is making a communication with the IP terminal of the private IP network, moves from the communication area of the private IP network to the communication area of the public network, the mobile terminal can continue the communication through the public network. With this operation, when a private IP network is constructed in an office, it is not necessary to install a lot of IP wireless base stations. As a result, a cost for introducing the private IP network can be suppressed.

BRIEF DESCRIPTION OF THE DRAWINGS

FIG. 2 is a block diagram showing an arrangement example of a dual terminal of FIG. 1;

FIG. 3 is a view showing information held by a memory of an IP-PBX of FIG. 1;

FIG. 4 is a view showing information held by a memory of a dual terminal of FIG. 2;

FIG. 5 is a sequence chart showing an operation of the mobile communication system according to the embodiment of the present invention; and FIG. 6 is a sequence chart showing an operation of the mobile communication system according to the embodiment of the present invention.

DESCRIPTION OF THE PREFERRED EMBODIMENTS

Figure 1:
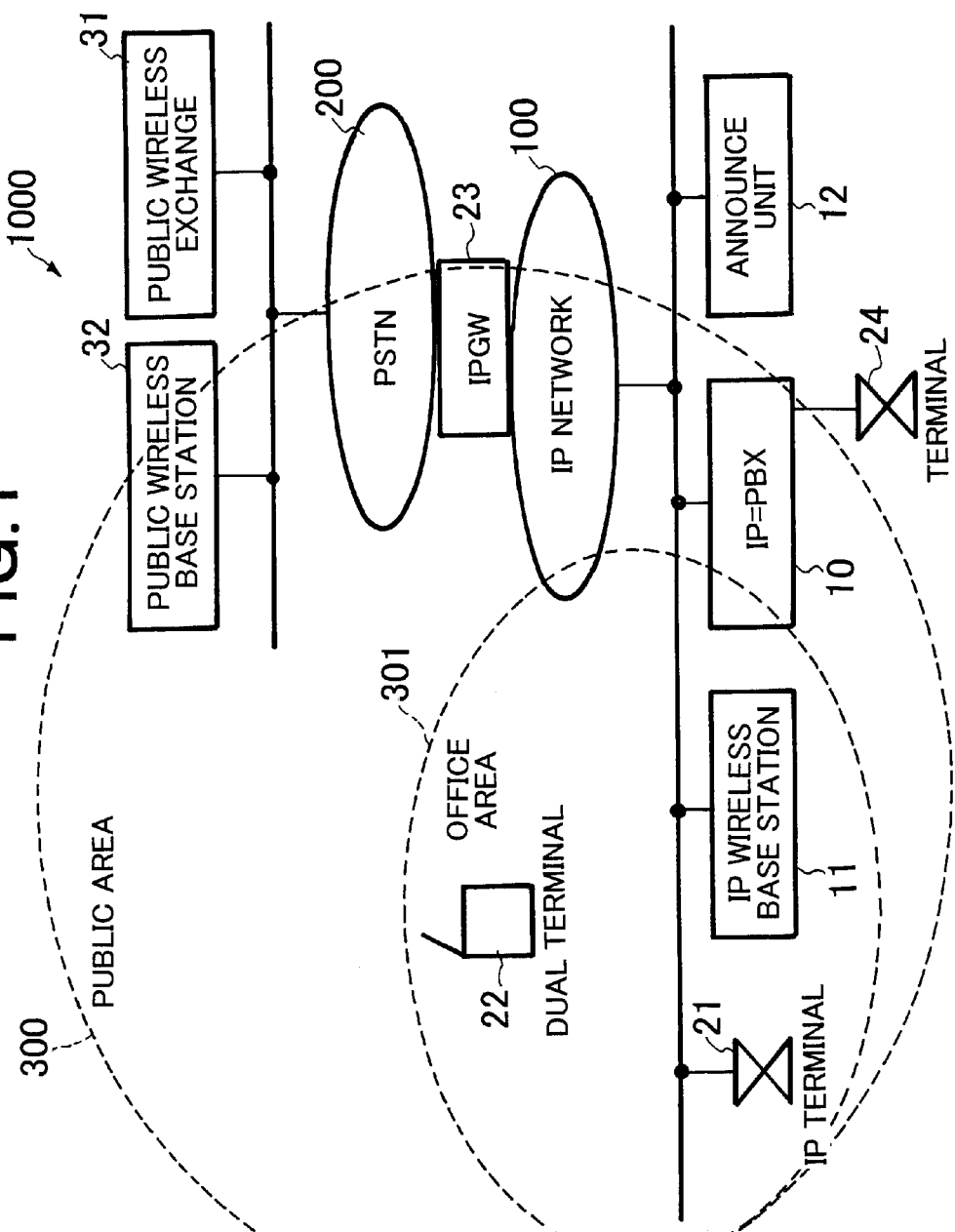
FIG. 1 is a block diagram showing an arrangement example of a mobile communication system according to an embodiment of the present invention.

FIG. 1 is a block diagram showing an arrangement example of a mobile communication system according to an embodiment of the present invention. In the mobile communication system 1000, an IP-PBX 10, an IP wireless base station 11, an IP terminal 21, an announce unit 12, and an IPGW (Internet Protocol Gateway) 23 are connected to an IP network 100.

The IP network 100 is connected to a PSTN (Public Switched Telephone Network) 200 through the IPGW 23 as a gateway device. A public wireless exchange 31 and a public wireless base station 32 exist in the PSTN 200.

A public area 300 is an area covered by the public wireless base station 32, and an office area 301 is an area covered by the IP wireless base station 11. A dual mode IP phone terminal (hereinafter, referred to as "dual terminal") 22 can carry out a wireless communication in the public area 300 through the public wireless base station 32 and further can carry out a wireless communication in the office area 301 through the IP wireless base station 11.

FIG. 2 is a block diagram showing an arrangement example of the dual terminal 22 of FIG. 1. The dual terminal 22 is composed of a wireless unit for public network 221, a wireless unit for private network 222, a CPU (central processing unit) 223, a speaker 224 used for a communication, a microphone 225, and a memory 226 for storing various types of information and programs. A combination of the CPU 223 and the memory 226 correspond to the control unit of the mobile terminal in the present invention.

The wireless unit for public network 221 and the wireless unit for private network 222 have a function for notifying the CPU 223 of a received radio wave level in a wireless communication and can carry out individual communications. When the wireless unit for public network 221 detects an incoming communication from a continuous connection number to be described below while a communication is processed by the wireless unit for the private network 222, the CPU 223 has a function for responding to the incoming communication unconditionally.

FIG. 3 is a table showing the information held by a memory (not shown) of the IP-PBX 10 of FIG. 1. The IP-PBX 10 has the extension numbers (E1) of terminals which are targets to be controlled such as the IP terminal 21 and the dual terminal 22, an equipment identifier (E2) for identifying the terminals, a communication identifier (E3) for identifying a combination of terminals for carrying out a communication, and a public number (E4) allocated to a terminal making use of a public network.

In the table of FIG. 3, the record of an extension number "2000" corresponds to the IP terminal 21 of FIG. 1, and the record of an extension number "2001" under the above record corresponds to the dual terminal 22. The same communication identifier (E3) "01" is recorded to both the records. This shows that a communication is carried out between the IP terminal 21 and the dual terminal 22 at the time.

FIG. 4 is a table showing the information held by the memory 226 of the dual terminal 22 (FIG. 2). The memory 226 of the dual terminal 22 holds the extension number (E5) of a terminal used in a private network, the public number (E6) of a terminal used in the public network, a continuous connection number (E7) which is a number to which a response must be made unconditionally when an incoming communication to the number is received, and the IP address (E8) of the IP-PBX 10. In the embodiment, the number "03-1111-1111" of the IPGW 23 (FIG. 1) is set as the continuous connection number (E7).

FIGS. 5 and 6 are sequence charts showing operations of the mobile communication system 1000. The operations of the mobile communication system 1000 will be explained referring to FIGS. 1 to 6.

When the dual terminal 22 is located inside of the public area 300, it registers the state information thereof to the public wireless exchange 31 together with the public number thereof (FIG. 4: E6) held by the memory 226 (a1 of FIG. 5). Further, when the dual terminal 22 is located inside of the office area 301, it registers the state information thereof to the IP-PBX 10 together with the extension number thereof (FIG. 4: E5) held by the memory 226 (a2 of FIG. 5).

The dual terminal 22 transmits an outgoing communication to the extension number of the IP terminal 21 in the office area 301 (a3 of FIG. 5), the IP-PBX 10 calls the IP terminal 21 (a4 of FIG. 5). When the IP terminal 21 responds to the call (a5, a6 of FIG. 5), a communication is started between the dual terminal 22 and the IP phone 21 (a7 of FIG. 5). At the time, the IP-PBX 10 sets the same value ("01") as the communication identifier (E3) of the dual terminal 22 and the IP terminal 21 as shown in FIG. 3.

An operation, when the dual terminal 22 moves toward the public area 300 apart from the office area 301 while it communicates with the IP terminal 21 (a8) through the IP wireless base station 11, will be explained referring to FIG. 6.

When the dual terminal 22 detects that the receiving level from the IP wireless base station 11 becomes lower than a threshold value as it moves, it notifies the IP-PBX 10 of a declaration of movement to outside of service area (a9 of FIG. 6). On receiving the declaration of movement to outside of service area, the IP-PBX 10 instructs the IPGW 23 to transmit a communication to the dual terminal 22 to the public number thereof (a10 of FIG. 6). At the time, the IP-PBX 10 instructs the IPGW 23 to transmit the communication to the dual terminal 22 after the communication identifier (FIG. 3: E3) of the dual terminal 22 is added to it.

When the IPGW 23, which received the instruction, transmits the communication to the public number of the dual terminal 22 (a11 of FIG. 6), the communication reaches the dual terminal 22 through the public wireless exchange 31 (a12 of FIG. 6). The dual terminal 22 compares the transmission source number of the reached communication with the continuous connection number (FIG. 4: E7) held by memory 226. In the embodiment, both the transmission source number and the continuous connection number are the numbers of the IPGW 23. When both the numbers agree with each other as described above, the dual terminal 22 automatically makes a response to the reached communication without the need of an operation carried out by a user (a13 of FIG. 6). When the response reaches the IPGW 23 through the public wireless exchanger 31 (a14), the IPGW 23 notifies the IP-PBX 10 that the dual terminal 22 automatically made the response (a15). With this operation, the dual terminal 22 is tentatively connected to the IPGW 23 (a16).

On receiving the notification as to the automatic response of the dual terminal 22, the IP-PBX 10 recognizes that the communication partner of the dual terminal 22 at the time is the IP terminal 21 referring to a communication identifier (FIG. 3: E3) as to the dual terminal 22. The IP-PBX 10 instructs the IP terminal 21 to connect it to the IPGW 23. When the IP terminal 21 is connected to the dual terminal 22 through the IPGW 23, the IP-PBX 10 instructs the IP terminal 21 and the dual terminal 22 to switch a communication path (a17, 18 of FIG. 6). With this operation, a communication path between the dual terminal 22 and the IP phone 21 through the IP wireless base station 11 is disconnected (a19, a20 of FIG. 6). Further, the communication between the dual terminal 22 and the IP terminal 21 is continued by a communication path through the public wireless base station 32 (a21 of FIG. 6).

Thereafter, when the IP-PBX 10 recognizes that the communication is finished by being disconnected from any one of the dual terminal 22 and IP phone 21, it issues an instruction for disconnection to the other terminal to thereby complete the communication (a22, a23 of FIG. 6).

As described above, in the embodiment, when the dual terminal 22, which is making a communication with the IP terminal 21 in the office area 301, moves to the public area 300 from the office area 301, the communication path at the time is changed to a communication path through the PSTN 200 while maintaining the communication. With this operation, the communication between the IP terminal 21 and the dual terminal 22 can be continued without causing a user being aware of the change of the communication path.

Further, according to the embodiment, a cost required to construct the private network can be reduced by employing the public area 300 using the PSTN 200 as an assist-network of the private network (office area 301). This is because the number of base stations necessary to the private wireless network can be reduced by virtually employing the public wireless phone network having a high area covering ratio as the private wireless network.

Note that, in the embodiment, the IP-PBX 10 recognizes that the communication partner of the dual terminal 22 is the IP terminal 21 by the communication identifier (FIG. 3: E3). However, when the present invention is embodied, the communication partner of the dual terminal 22 may be recognized by other method. For example, when the dual terminal 22 sends a declaration of movement to outside of service area to the IP-PBX 10 (FIG. 6:a9), it may also notify the IP-PBX 10 of the identification information of the communication partner at the time (extension number and the like). With this operation, the IP-PBX 10 can recognize the communication partner of the dual terminal 22 which issues the declaration of movement to outside of service area without previously recording the communication identifier.

The example in which the dual terminal 22 moves from the office area 301 to the public area 300 is described using FIG. 1 in the embodiment, a case, in which the dual terminal 22 moves from the public area 300 to the office area 301, is also a target of the present invention.

When the dual terminal 22 temporarily moves to outside of both the office area 301 and the public area 300 in the mobile communication system 1000, the system 1000 may be operated to transmit an announce from the announce unit 12 to the IP terminal 21 of the communication partner. With this operation, a communication from the IP terminal 21 can be prevented from being disconnected as well as the dual terminal 22 can be connected to the IP terminal 21 again after it moves to the public area 300.

Further, as shown in FIG. 1, it is also a target of the present invention to operate the IP terminal 21 in place of a terminal 24 directly connected to the IP-PBX 10.

Although the exemplary embodiments of the present invention have been described in detail, it should be understood that various changes, substitutions and alternatives can be made therein without departing from the spirit and scope of the invention as defined by the appended claims. Further, it is the inventor's intent to retrain all equivalents of the claimed invention even if the claims are amended during prosecution.

What is claimed is:

1. A mobile communication system, comprising:
   a private IP network and a public network;
   a gateway device connecting the private IP network and the public network;
   an IP wireless base station connected to the private IP network and providing a first communication area;
   an IP-PBX serving for communication exchange for the IP wireless base station and connected to the private IP network;
   an IP terminal connected to the IP-PBX;
   a public wireless base station connected to the public network and providing a second communication area;
   a public wireless exchange serving for communication exchange for the public wireless base station and connected to the public network;
   a mobile terminal to which a first phone number for the private IP network and a second phone number for the public network are allocated,
   the mobile terminal comprising:
      a memory holding a continuous connection number which is a number to which a response must be made unconditionally when an incoming communication to the number is received, the continuous connection number to be set in the memory including a phone number of the gateway;
      a wireless unit communicating with the public wireless base station;
      a wireless unit communicating with the IP wireless base station; and
      a control unit capable of detecting a movement that the mobile terminal moves from the first communication area to the second communication area while the mobile terminal communicates with the IP terminal through the IP wireless base station,
   the control unit notifying the IP-PBX of the movement of the mobile terminal at a time of detection of the movement,
   the IP-PBX instructing the gateway device to call the second phone number when the movement is notified of,
   the gateway device making a call through the public wireless exchange to the second phone number of the mobile terminal,
   the control unit comparing a phone number of the gateway device making the call with the continuous connection number held by the memory,
   the control unit automatically making a response to the call when the phone number of the gateway and the continuous connection number agree with each other and transmitting the response to the public wireless exchange while continuing communication with the IP terminal through the IP wireless base station, the public wireless exchange transferring the response to the gateway device, the gateway device notifying the IP-PBX of the response from the mobile terminal to connect with the mobile terminal, whereby the mobile terminal is tentatively connected to the gateway, and the IP-PBX switching a communication path between the mobile terminal and the IP terminal from a communication path through the IP wireless base station to a communication path through the public wireless base station when the IP-PBX receives the response from the mobile terminal through the gateway device.

2. A mobile communication system according to claim 1, wherein the IP-PBX records a communication identifier for identifying that a communication partner of the mobile terminal is the IP terminal.

3. A communication holding method, used in a mobile communication system comprising:

a private IP network and a public network;

a gateway device connecting the private IP network and the public network;

an IP wireless base station connected to the private IP network and providing a first communication area;

an IP-PBX serving for communication exchange for the IP wireless base station and connected to the private IP network;

an IP terminal connected to the IP-PBX;

a public wireless base station connected to the public network and providing a second communication area;

a public wireless exchange serving for communication exchange for the public wireless base station and connected to the public network; and a mobile terminal to which a first phone number for the private IP network and a second phone number for the public network are allocated, the mobile terminal comprising: a memory holding a continuous connection number which is a number to which a response must be made unconditionally when an incoming communication to the number is received, the continuous connection number to be set in the memory including a phone number of the gateway; a wireless unit communicating with the public wireless base station; a wireless unit communicating with the IP wireless station; and a control unit capable of detecting a movement that the mobile terminal moves from the first communication area to the second communication area while the mobile terminal communicates with the IP terminal through the IP wireless base station, the method comprising:

detecting, at the mobile station, a movement that the mobile terminal moves from the first communication area while the mobile terminal communicates with an IP terminal through the IP wireless base station;

notifying, from the mobile station, the IP-PBX of the movement of the mobile terminal at a time of detection of the movement;

instructing, from the IP-PBX when the movement is notified of, the gateway device to call the second phone number;

making a call from the gateway device to the second phone number of the mobile terminal through the public wireless exchange;

comparing, at the mobile terminal, a phone number of the gateway device making the call with the continuous connection number held by the memory;

making a response to the call by the mobile terminal when the phone number of the gateway and the continuous connection number agree with each other and transmitting the response to the public wireless exchange while the mobile terminal is continuing communication with the IP terminal through the IP wireless base station;

transferring the response from the public wireless exchange to the gateway device;

notifying, from the gateway device, the IP-PBX of the response from the mobile terminal, whereby the mobile terminal is tentatively connected to the gateway;

connecting the mobile terminal and the gateway device; and switching a communication path between the mobile terminal and the IP terminal from a communication path through the IP wireless base station to a communication path through the public wireless base station.

4. A communication holding method according to claim 3, further comprising recording a communication identifier for identifying that a communication partner of the mobile terminal is the IP terminal to the IP-PBX.

* * * * *